INVENTORS
K. C. BOTTENBERG
H. V. HENDRIX
DeWAYNE MADDOX
BY
Hudson & Young
ATTORNEYS INVENTORS
K. C. BOTTENBERG
H. V. HENDRIX
DeWAYNE MADDOX
BY Hudson & Young
ATTORNEYS Aug. 29, 1961  K. C. BOTTENBERG ET AL  2,998,016
SURGE SYSTEM Filed June 1, 1959 3 Sheets-Sheet 3

INVENTORS
K.C. BOTTENBERG
H.V. HENDRIX
D eWAYNE MADDOX
BY
Hudson E. Young
ATTORNEYS

United States Patent Office 2,998,016
Patented Aug. 29, 1961

2,998,016
SURGE SYSTEM
Kenneth C. Bottenberg and Hurshel V. Hendrix, Bartlesville, Okla., and De Wayne Maddox, Phillips, Tex., assignors to Phillips Petroleum Company, a corporation of Delaware
Filed June 1, 1959, Ser. No. 817,107
9 Claims. (Cl. 137—8)

This invention relates to a surge system. In another aspect, it relates to a method and apparatus for supplying a normally liquid, volatile hydrocarbon feed to fractionators, or the like, at a constant rate from a source thereof having a normally variable rate of flow. In another aspect, it relates to a method and apparatus wherein cooperative surface and subsurface, or underground, surge facilities are used for supplying a normally liquid, volatile hydrocarbon feed, such as natural gasoline, to fractionators, or the like, at a constant rate from a source thereof having a normally variable rate of flow, such as a common header to which are connected the supply lines from a number of natural gasoline plants having fluctuating outputs and variable capacities.

In various industrial processes or operations it is often necessary to have at all times an ample and constant supply of one or more materials or feeds. For example, in the refining of natural gasoline it is necessary that the supply of this product or feed to fractionating towers be relatively constant since such towers are designed and constructed for a specific feed rate or range of feed rates. Where the available supply of such product is not constant or where it fluctuates, it is necessary to employ some type of surge system in order to supply the product as feed having the requisite constant flow rate demanded by the process or operation. For example, in the refining of natural gasoline the outputs of several plants are conveyed in a common stream to a surface surge tank of limited capacity, from which the product is supplied to fractionators at a constant rate of flow. Due to the different capacities and periods of operation of the several plants, the common stream of natural gasoline will normally have a fluctuating or variable flow rate different from that of the desired flow rate of the feed sent to the fractionators for further processing.

Where the amount of supply or product conveyed to the surface surge system is variable and relatively large, the capacity of the surge system must of necessity be correspondingly large enough to accommodate the product. Generally, this means that expensive steel tanks of massive construction and capacity may be required. Such surge tanks must be designed to withstand the vapor pressure of the product. Moreover, where the product contains any substantial amount of solid, suspended impurities or foreign substances, such as iron sulfide, it is desirable that such tanks have sufficient volume to enable the settling of the suspended impurities. If the product to be handled is normally a volatile liquid, such as natural gasoline or other hydrocarbons, the filling and emptying of the surge tanks will also result in severe "breathing" losses due to changes in temperature during the heat of the day and the cool of the night. While these losses can be reduced by providing the storage tanks with breather roofs or the like, such equipment is relatively costly and does not eliminate all of the losses of valuable product, or completely insure the safe handling of the volatile hydrocarbon.

The problem of adequate storage in surge facilities is also aggravated where the product handled is one which experiences seasonal peak demand and corresponding seasonal slack periods, such as that common to the natural gasoline and liquefied petroleum gas industries. These fluctuations in demand also require large storage facilities. The use of large, high pressure, sealed tanks for this purpose necessarily entails greater expense in the handling and storage of the product. In many cases the large bulk storage of product is not economically feasible.

Accordingly, an object of this invention, is to provide an improved surge system. Another object is to provide an improved method and apparatus for supplying a normally liquid, volatile hydrocarbon feed to fractionators, or the like, at a constant rate from a source thereof having a normally variable rate of flow. Another object is to provide a method and apparatus wherein cooperative surface and subsurface, or underground, surge and storage facilities are used for supplying a normally liquid, volatile hydrocarbon feed, such as natural gasoline, to fractionators or the like, at a constant rate of flow from a variable source thereof, such as a common header to which are connected the supply lines from a number of plants having fluctuating outputs and variable capacities. Another object is to provide a surge system of large capacity which is relatively unaffected by changes in ambient temperature. Another object is to provide a surge system having sufficiently large capacity to enable the effective settling of solid impurities and permit the composition of product handled to stabilize. Another object is to minimize the breathing losses during the handling of relatively high volatile, normally liquid hydrocarbons. A further object is to provide a safe, reliable, and relatively economical improved surge system for handling normally liquid, volatile hydrocarbons, such as natural gasoline. Further objects and advantages of this invention will become apparent to those skilled in the art from the following discussion, appended claims, and accompanying drawing in which:

The "normally liquid, volatile hydrocarbons" used in this invention includes any of those which are normally liquid under the conditions of operation of this invention, such as natural gasoline, straight run or cracked gasoline, kerosene, liquefied petroleum gas, crude oil, and the like.

Reference will now be made to the accompanying drawing wherein like parts have been designated with like reference numbers. For purposes of illustration and description, the subject invention will be hereinafter set forth by showing its utility in the handling of natural gasoline, although it is to be understood that it is not to be limited thereto since it is applicable wherever it is desired to handle any highly volatile, normally liquid hydrocarbon or the like.

Figure 1:
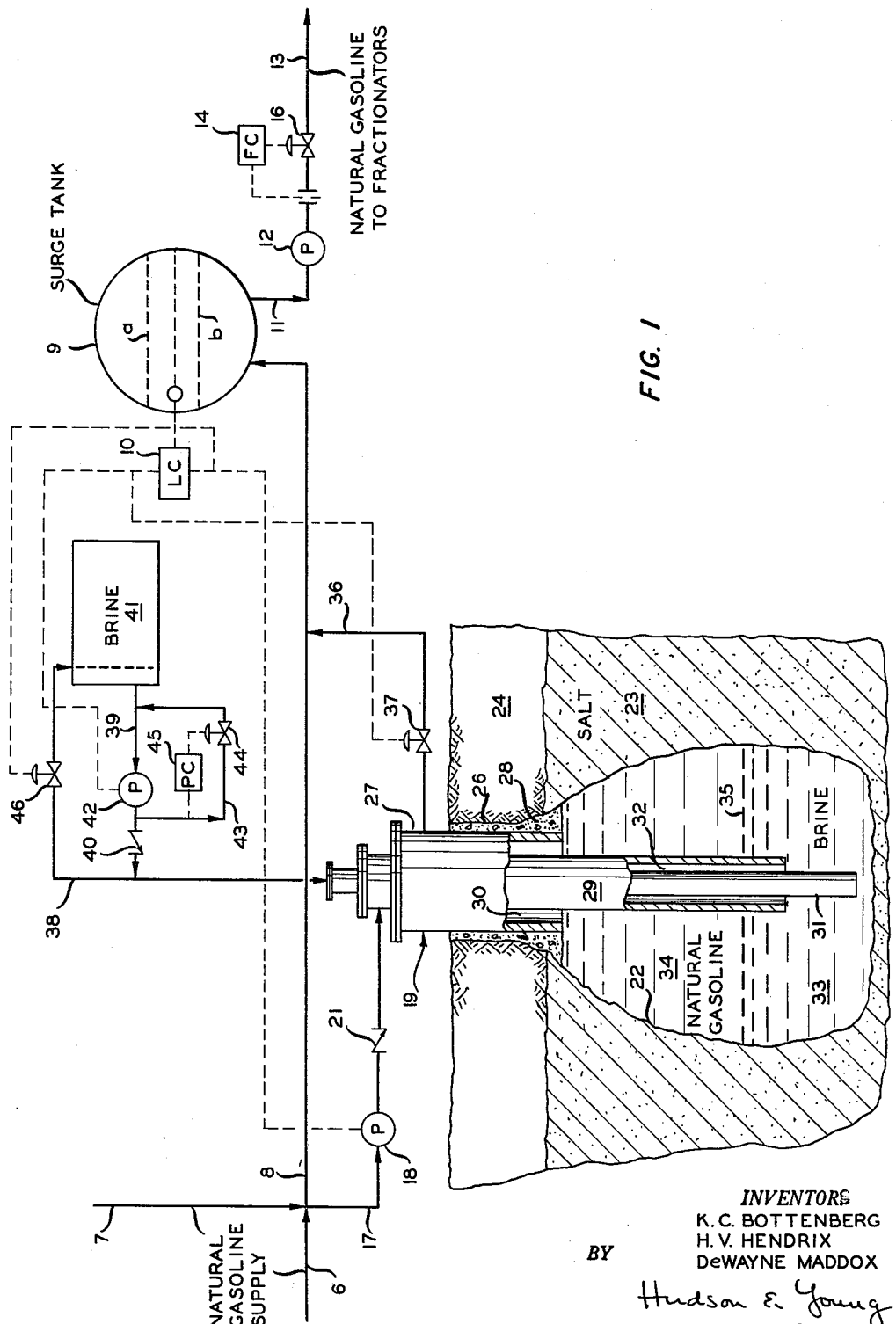
FIGURE 1 is a diagrammatic view in elevation and partial section of one embodiment of the surge system of this invention.

Referring to FIGURE 1, one or more streams of natural gasoline are conveyed or pumped via lines 6 and 7 to a common point or header, line 8, the flow rate in this header normally fluctuating or varying, e.g., from hour to hour, night and day, week to week, season to season, etc. Further, the compositions of the various streams may differ, e.g., sometimes the natural gasoline may be almost pure propane. The supply of natural gasoline in line 8 is conveyed to a surface surge tank 9, such as a cylindrical steel tank of limited capacity, the liquid level in this tank being constantly monitored by means of a suitable liquid level controller 10. From the surge tank 9, natural gasoline is withdrawn as required via line 11 and pumped by means of pump 12 to feed line 13. The feed rate in line 13 is maintained at a relatively constant value (i.e., at fixed rate, or within a range of feed rates) by means of a flow controller 14 and a suitable flow control valve 16 which is operatively connected to flow controller 14, the natural gasoline feed in line 13 being conveyed to fractionators or the like for further processing. When the rate of flow of natural gasoline in lines 6, 7 is greater than that desired for constant rate of flow in line 13, some of the natural gasoline from lines 6, 7 is conveyed by line 17, having a pump 18 therein to an underground storage cavern generally designated 19, the portion of line 17 downstream from pump 18 having a check valve 21 therein.

Underground cavern 19 is formed in a generally impermeable earth formation, either by conventional mining methods, or, preferably, by dissolving out a soluble material with solvents to creat a storage space in the soluble formation, for example a salt dome.

Since the cavern is located below ground, the contents thereof are not subjected to the fluctuating ambient temperatures above ground, the temperature underground being relatively constant. Such storage space is far more economical than would be surface storage or surge tanks above ground having comparable capacity. The underground cavern comprises a cavity 22 formed within a soluble formation 23, such as salt, with an overlying formation 24 thereabove. The underground cavern 19 is provided an access bore 26 which communicates with the cavity 22. Depending within the access bore 26 is a casing 27 which is cemented in place with cement 28 to provide the cavern with a fluid-tight seal. Depending within casing 27 is a string of tubing 29, an annulus 30 being formed between the string 29 and casing 27, the lower end of the string 29 depending beneath the lower end of casing 27. If desired, another string of tubing 31 can be inserted within the string 29, an annulus 32 being formed therebetween, the lower end of the inner string 31 depending below the lower end of the outer string 29. A pool of displacing liquid 33, such as brine, occupies the lower portion of the cavern with a layer 34 of the immiscible, lighter stored product, natural gasoline, thereabove occupying the upper portion of the cavern, an interface 35 being formed between the product 34 and brine 33.

Because of the large, economical storage space provided by the underground cavern, the stored product therein will have sufficient residence time to enable the composition thereof to become stabilized. Further, this large storage space permits foreign materials, such as iron sulfide, normally suspended in the introduced product, to drop out and settle in the bottom of the cavern.

The product 34 within the cavity 22 can be supplied to surge tank 9 via line 36 and supply line 8, line 36 communicating at the surface with the annulus 30 and having a suitable flow control valve 37 therein. In order to effect the withdrawal of product 34 from cavity 22, displacing liquid can be pumped via lines 39 and 38 from brine supply 41, such as a brine tank or pit, the displacing liquid being injected into the upper end of the inner string of tubing 31. Line 39 is provided with a suitable pump 42 and a check valve 40. To insure control over the displacing liquid, line 39 can be provided with a by-pass line 43, by-passing pump 42, the by-pass line having a siutable flow control valve 44 therein operatively controlled by pressure controller 45 which is operatively connected to line 43. During the filling of cavity 22 with product 34, the brine 33 is displaced from the underground cavern 19 via inner string of tubing 31 and conveyed via line 38 to the brine supply tank 41, line 38 having a suitable flow control valve 46 therein.

As mentioned hereinbefore, the liquid level within surge tank 9 is constantly monitored by liquid level controller 10. The latter instrument is operatively connected to pumps 18 and 42, controlling the operation thereof, and is also operatively connected to flow control valves 37 and 46, controlling the operation thereof.

Figure 2:
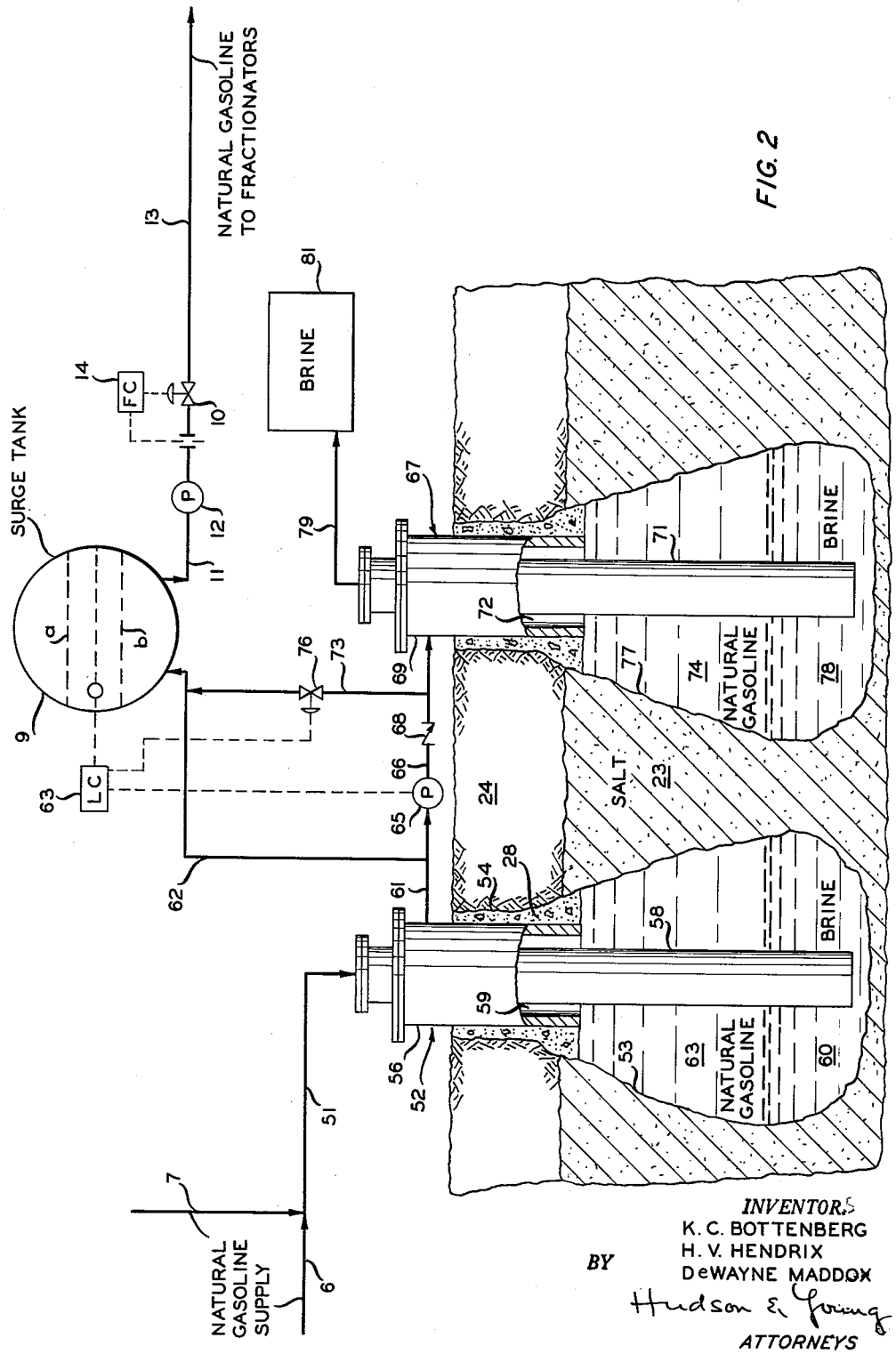
FIGURE 2 is a view similar to FIGURE 1 illustrating another embodiment of this invention.

Referring now to the embodiment set forth in FIGURE 2, the various streams 6 and 7 of natural gasoline are conveyed by a common header 51 to an underground cavern generally designated 52. This cavern is in some respects similar to that of FIGURE 1. Cavern 52 comprises a cavity 53 formed within a soluble formation 23, such as salt, above which formation there is an overlying formation 24. The cavern 52 is provided with access bore 54 in which is cemented a casing 56. Depending within casing 56 is a string of tubing 58, an annulus 59 being formed therebetween, the lower end of the inner string, depending below that of the casing. The annular space 59 is connected at the surface to a line 61 which in turn is connected to a line 62 for supplying the stored product 63 from the cavern 52 to a surface surge tank 9. The latter surge tank is also provided with a liquid level controller 63 which constantly monitors the level of a natural gasoline within the surge tank. Withdrawal of the natural gasoline from surge tank 9 can be effected in a manner like that of FIGURE 1. It is thus seen that in the embodiment of FIGURE 2 all of the natural gasoline supply is conveyed to the underground cavern 52 before it is conveyed to the surge tank 9.

Where the rate of flow of a natural gasoline within line 61 is greater than that desired in the feed line 13, the product 63 withdrawn from the storage cavern 52 it is also pumped by pump 65 and conveyed via line 66 to underground cavern 67, the line 66 having a check valve 68 therein.

The underground cavern 67 is similar to underground cavern 52, cavern 67 being provided with a casing 69 and inner string of tubing 71 with an annulus 72 formed therebetween. Line 66 communicates via line 73 with line 62 when it is desired to withdraw the natural gasoline 74 from cavern 67, line 73 being provided with a flow control valve 76. The lower portion of cavity 77 is occupied by a pool of brine 78, the filling and emptying of the displacing liquid being effected by means of line 79 connected at one end to the upper end of string 71 and at the other end to a gravity flow brine tank or pit 81. The underground cavern 52 can be similarly provided with a gravity flow brine tank, but has not been shown in the drawing for purposes of brevity.

The liquid level controller 63 is operatively connected to pump 65 and flow control valve 76, controlling the operations thereof.

In the operation of the surge system set forth in FIGURE 1, natural gasoline is conveyed through lines 6 and 7 at a normally variable flow rate. Some or all of the natural gasoline passes to the surface surge tank 9 and from the latter it is conveyed via line 13 to fractionators or other processing equipment at a constant flow rate. The liquid level of natural gasoline within surge tank 9 is constantly monitored by means of liquid level controller 10. The liquid level in surge tank 9 will rise and fall between a predetermined high level $a$ and a predetermined low level $b$. When the liquid level controller 10 senses a rise in liquid level within tank 9 to the predetermined high level $a$, indicating a large supply of natural gasoline in that tank, the liquid level controller operatively causes the operation of pump 18, permitting part of the supply of natural gasoline to be pumped and conveyed via line 17 to the underground cavern 19 and at the same time a part of the supply is conveyed via line 8 to the surge tank 9. The liquid level controller 10 also is operatively adapted to prevent the withdrawal of the product 34 from the cavern 19 by maintaining the flow control valve 37 in a closed position. At the same time, with pump 18 in operation, the liquid level controller maintains the flow control valve 46 in line 38 in an open position so as to permit the brine 33 in the cavern 19 to be displaced to brine tank 41 via line 38.

When the liquid level in surge tank 9 falls to a point intermediate and half-way between predetermined levels

*a* and *b*, liquid level controller 10 stops pump 18 and closes valve 46.

When liquid level controller 10 senses the drop in the level of the natural gasoline in tank 9 to the predetermined low value *b*, indicating a low supply of gasoline in tank 9, the liquid level controller accordingly operatively starts pump 42, causing the brine in the brine tank 41 to be pumped via lines 39 and 38 into the tubing string 31, the brine introduced into the cavity 22 of the cavern 19 causing the displacement of the stored natural gasoline 34. At the same time, the liquid level controller 10 operatively opens the flow control valve 37 in line 36, allowing the displaced natural gasoline to be conveyed via line 36 to the supply line 8.

When the liquid level in surge tank 9 rises to a point intermediate and half-way between predetermined levels *a* and *b*, the liquid level controller 10 stops pump 42 and closes valve 37.

If the liquid level in surge tank 9 rises to predetermined high level *a*, or falls to predetermined level *b*, the sequence of operations as described above is repeated to bring the level to the intermediate point between levels *a* and *b*.

As an example of a liquid level control system which can be used in carrying out the operation of the embodiment shown in FIGURE 1, reference will now be made to the control system diagrammatically illustrated in FIGURE 3.

Figure 3:
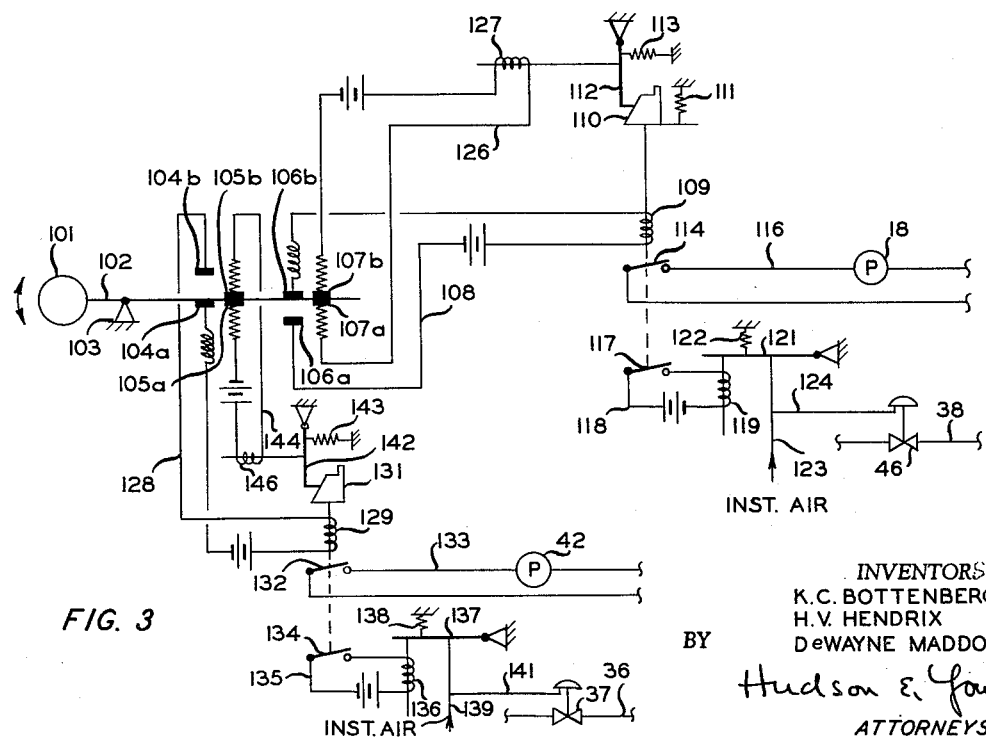

In FIGURE 3, a float 101 is adapted to float on the top of the natural gasoline in the surge tank 9 of FIGURE 1. The float 101 is connected to a movable arm 102 which is pivoted at 103. The arm 102 has associated therewith four pairs of electrical contact: 104*a* and 104*b*, 105*a* and 105*b*, 106*a* and 106*b*, and 107*a* and 107*b*. These pairs of contacts are adapted to come into juncture and break with the rise and fall of the float 101, thereby making and breaking electrical circuits, energizing and de-energizing solenoid coils, opening and closing switches in electrical circuits, and thereby alternately starting and stopping the motors of the pumps 18 and 42 and opening and closing the valves 37 and 46 illustrated in FIGURE 1.

The upward movement of arm 102 is biased by a spring or flexible wire attached to contact 106*b*, and the arm's downward movement biased by a similar flexible wire attached to contact 104*a*, contacts 106*b* and 104*a* being attached to the arm 102. Contacts 105*a* and *b*, and 107*a* and *b* having springs attached thereto which limit the maximum distances they can extend to the positions shown in FIGURE 3, at which position they are in juncture.

When float 101 rises to the predetermined high liquid level *a*, junction is made between contacts 106*a* and 106*b*, thereby completing an electrical circuit 108 which causes the energizing of a solenoid coil 109. When the latter is energized, link 110 is pulled downwardly in opposition to a spring 111 tending to retain the link 110 in the position shown. As link 110 moves downward, a pivoted lock arm 112 slides along the inclined surface of the link, this pivoted lock arm 112 being pulled to the right by a spring 113. When the link 110 has moved downwardly a sufficient distance, the lock arm 112 occupies a locking position adjacent the upper flat face of the link 110, locking the link 110 in its downward position. When the link 110 is in its downward position, it causes switch 114 to close, thereby completing the electric circuit 116, causing the operation of pump 18. The downward movement of the link 110 also causes switch 117 to close, thereby completing electric circuit 118, causing solenoid coil 119 to energize. When the latter is energized, pivoted arm 121 moves downward in opposition to spring 122, thereby causing instrument air line 123 to increase the air pressure in air line 124 connected to valve 46 in line 38, causing the valve 46 to open.

As the surge tank 9 drops in level, the junction between contacts 106*a* and 106*b* is broken, but pump 18 continues to operate and valve 46 is maintained in an open position because the pivoted locking arm 112 prevents link 110 from moving to its upper position, despite the de-energizing of solenoid coil 109. However, when the liquid level in the surge tank 9 reaches an intermediate liquid level between predetermined liquid levels *a* and *b*, the float actuated arm 102 occupies the horizontal position shown in FIGURE 3. In this position, junction is made between contacts 107*a* and 107*b*, completing the electric circuit 126 and thereby energizing solenoid coil 127. When the latter is energized, lock arm 112 is pulled to the left, in opposition to spring 113, thereby unlocking the link 110 and allowing its movement to its upper position. As a result, switches 114 and 117 are broken and pump 18 is stopped and valve 46 is closed.

When the liquid level in surge tank 9 falls to the predetermined low liquid level *b*, the float 101 moves accordingly and causes contacts 104*a* and 104*b* to come to junction, thereby completing electric circuit 128 and causing solenoid coil 129 to energize. When the latter is energized, link 131 is pulled downward, the pivoted locking arm 142 sliding along the inclined surface of the link, the pivoted arm 142 being pulled to the right by spring 143 to a locking position. When the link 131 is in its downward position, switch 132 is closed, thereby completing the electric circuit 133 and causing pump 42 to operate. The downward movement of the link 131 also causes switch 134 to close, thereby completing the electric circuit 135 which causes solenoid coil 136 to energize. When the latter is energized, pivoted arm 137 moves downwardly in opposition to spring 138, thereby causing the air in instrument air line 139 to increase the air pressure in air line 141, causing valve 37 in line 36 to open. When the liquid level in the surge tank 9 begins to rise, the junction between contacts 104*a* and 104*b* is broken, but pump 42 continues to operate and valve 37 is maintained in an open position because the link 131 is locked by pivoted arm 142 in its downward position, despite the de-energizing of the solenoid coil 129.

When the liquid level in surge tank 9 reaches its intermediate position between predetermined levels *a* and *b*, junction is made between contacts 105*a* and 105*b*, thereby completing the electric circuit 144, causing solenoid coil 146 to energize. When the latter is energized, locking arm 142 is pulled to the left, in opposition to spring 143, thereby unlocking the link 131, allowing it to move to its upper position and open switches 132, 134, causing pump 142 to stop and valve 37 to close.

In the operation of the embodiment set forth in FIGURE 2, all of the supply of natural gasoline from the processing plants or source of supply is conveyed via line 51 to the underground cavern 52. Because of the large capacity of cavity 53, suspended foreign material, such as iron sulfide, drops out of the product introduced into the cavern 52 and settles in the bottom thereof where its presence is harmless in that it need not be removed or otherwise be of concern. From cavern 52, the natural gasoline is then conveyed via lines 61 and 62 to the surge tank 9. The liquid level controller 63 constantly monitors the height of the liquid level within the surge tank 9, the level rising and falling between predetermined levels *a* and *b*. If the level within surge tank 9 rises to predetermined high value *a*, it operatively causes pump 65 to start up, while valve 76 in line 73 is in a normally closed position. When the liquid level falls to a point intermediate and half-way between predetermined levels *a* and *b*, liquid level controller 10 stops pump 65.

When the liquid level controller 63 senses a drop in the level within surge tank 9 to predetermined value *b*, the liquid level controller 63 operatively opens valve 76, permitting brine in tank 81 to flow under the force of gravity into the cavern 67 and cause the natural gasoline 74 to be displaced from that cavern 67 via annular space 72, the displaced natural gasoline then flowing from cavern 67 via lines 66 and 73 to the supply line 62. When the liquid level rises to a point intermediate and half-way between predetermined levels $a$ and $b$, liquid level controller 63 closes valve 76.

If the liquid level in surge tank 9 rises to predetermined high level $a$, or falls to predetermined level 6, the sequence of operations as described above is repeated to bring the level to the intermediate point between levels $a$ and $b$.

As an example of a liquid level control system which can be used in the operation of the embodiment shown in FIGURE 2, reference will now be made to the control system diagrammatically shown in FIGURE 4, which in some aspects is similar to that of FIGURE 3.

Figure 4:
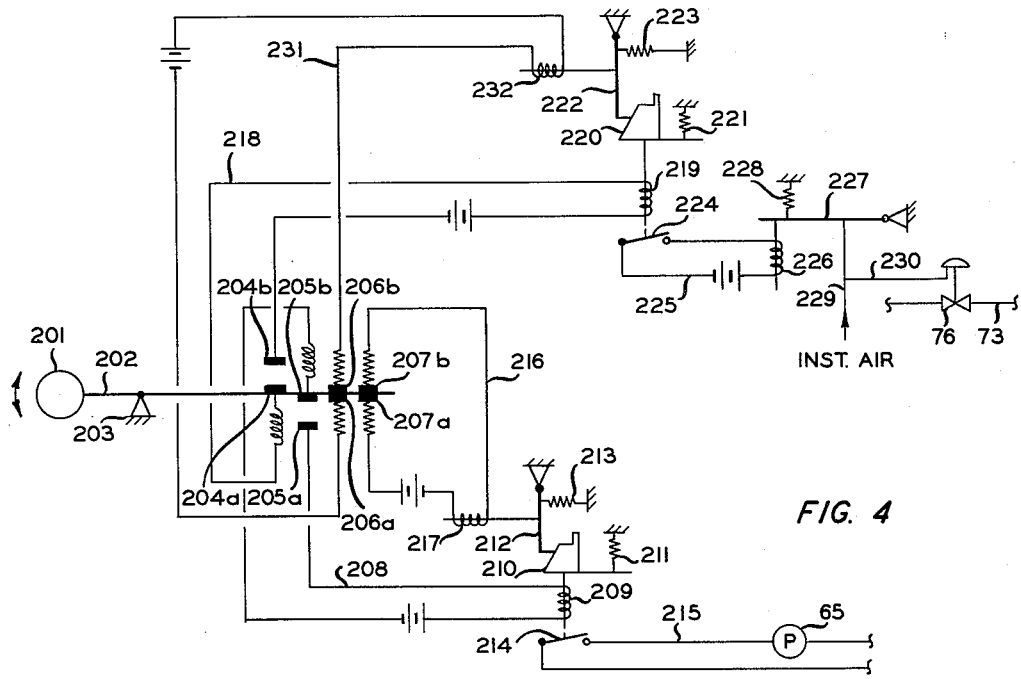
FIGURES 3 and 4 are diagrammatic views of control systems which can be used in automatically controlling the surge systems of FIGURES 1 and 2, respectively.

In FIGURE 4, a float 201 is adapted to float on the top of the natural gasoline in the surge tank 9 of FIGURE 2. Float 201 is connected to float arm 202 which is pivoted at point 203. This float arm 202 has associated therewith four pairs of electrical contacts, 204a and 204b, 205a and 205b, 206a and 206b, and 207a and 207b. With the rise and fall of the float arm 202, these contacts come into junction and are broken, thereby making and breaking electrical circuit, energizing and de-energizing certain solenoid coils, thereby opening and closing certain switches to cause the starting and stopping of pump 65 and the opening and closing of valve 76.

In FIGURE 4, when the liquid level in surge tank 9 rises to the predetermined high liquid level $a$, junction is made between contact 205a and 205b, thereby completing electric circuit 208, causing solenoid coil 209 to energize. When the latter is energized, link 210 is pulled to a downward position, the locking arm 212 sliding along the inclined surface of the link to a locking position, this arm 212 being pulled to the right by a spring 213. When the link 210 is in its downward locked position, switch 214 is closed, thereby completing electric circuit 215 which causes pump 65 to operate. When the liquid level in the surge tank 9 begins to fall, the junction between contacts 205a and 205b is broken, thereby causing coil 209 to de-energize. However, the link 210 is held in its downward locked position by locking arm 212, so as to continue the operation of pump 65. When the level in the surge 9 reaches its intermediate position, contacts 207a and 207b come into junction, thereby completing electric circuit 216 causing solenoid coil 217 to energize. When the latter is energized, the locking of 212 is pulled to the left, in opposition to spring 213, thereby unlocking link 210 and allowing it to return to its upper position. As a result, switch 214 is broken and pump 65 stops.

When the liquid level within the surge tank 9 of FIGURE 2 reaches its predetermined low liquid level $b$, junction is made between contacts 204a and 204b, thereby completing electric circuit 218 and causing solenoid coil 219 to energize. When the latter is energized, link 220 is pulled in a downward position, the locking arm 222 sliding along the inclined surface of the link to a locking position, the movement of the locking arm 222 along the inclined surface being aided by the pulling of spring 223. In its downward locked position, the link 220 causes switch 224 to close thereby completing electric circuit 225 and causing solenoid coil 226 to energize. When the latter is energized, pivoted arm 227 is pulled downwardly, in opposition to spring 228, thereby causing the air in instrument air line 229 to increase the air pressure in air line 230, whereby valve 76 in line 73 is open.

When the liquid level in surge tank 9 begins to rise, the junction between contacts 204a and 204b is broken, but the valve 76 is maintained in its open position because the link 220 is locked in position by locking arm 222. However, when the liquid level in the surge tank 9 reaches a point intermediate its predetermined levels $a$ and $b$, junction is made between contacts 206a and 206b, there-by completing electric circuit 231 and causing solenoid coil 232 to energize. When the latter is energized, the locking arm 222 is pulled to the left, in opposition to spring 223, so as to unlock link 220 and allowing it to move to its upper position and open switch 224. When the latter is opened, solenoid coil 226 is de-energized and this causes valve 76 to close.

Various modifications and alterations of this invention will become apparent to those skilled in the art from the foregoing discussion and accompanying drawing, and it should be understood that the instant invention is not to be unduly limited to that set forth hereinbefore for illustrative purposes.

We claim:
1. A process for supplying a liquid at a constant flow rate from a source thereof having a normally variable flow rate, which comprises passing said liquid from said source to a surface surge zone, withdrawing said liquid from said surface surge zone and passing it therefrom at said constant flow rate, continuously monitoring the liquid level of said liquid in said surface surge zone, passing a portion of said liquid from said source to an underground surge zone when the liquid level in said surface surge zone reaches a predetermined high liquid level, and passing liquid from said underground surge zone to said surface surge zone when the liquid level in said latter zone reaches a predetermined low liquid level.

2. The process according to claim 1 wherein said underground surge zone comprises a cavern formed within an underground impermeable formation having an access bore communicating with ground surface with a pool of liquid displacing medium heavier than and immiscible with said liquid occupying the lower portion of said cavern.

3. The process according to claim 2 wherein said liquid displaces said liquid displacing medium from said cavern when said liquid is introduced therein, and wherein said liquid is displaced from said cavern by said liquid displacing medium when said liquid is passed to said surface surge zone.

4. A process for supplying a liquid at a constant flow rate from a source thereof having a normally variable flow rate, which comprises passing said liquid from said source to a surface surge zone, withdrawing said liquid from said surface surge zone and passing it therefrom at said constant flow rate, continuously monitoring the liquid level of said liquid in said surface surge zone, said liquid level normally varying in height between a predetermined high liquid level and a predetermined low liquid level, passing a portion of said liquid from said source to an underground surge cavern when the liquid level in said surface surge zone reaches said predetermined high liquid level, said cavern comprising a cavity formed within an underground impermeable formation and having an access bore communicating with the ground surface, the lower portion of said cavity being normally occupied by a pool of liquid displacing medium heavier than and immiscible with said liquid, said liquid displacing said displacing medium from said cavern when said liquid is introduced therein, discontinuing the passing of said liquid into said cavern when the liquid level in said surface surge zone falls to a point intermediate said predetermined liquid levels, passing said liquid from said cavern to said surface surge zone when the liquid level therein falls to said predetermined low liquid level, said displacing liquid being introduced into said cavern to thus displace said liquid therefrom, and discontinuing the withdrawal of said liquid from said cavern when the liquid level in said surface surge zone reaches said point intermediate said predetermined liquid levels.

5. The process according to claim 4 wherein said liquid is natural gasoline, and said displacing medium is brine.

6. A process for supplying a liquid at a constant flow rate from a source thereof having a normally variable flow rate, which comprises passing said liquid from said source to a first underground surge cavern, continuously withdrawing said liquid therefrom and passing it to a surface surge zone, withdrawing said liquid from said surface surge zone and passing it therefrom at said constant flow rate, continuously monitoring the liquid level of said liquid in said surface surge zone, said liquid level normally varying in height between a predetermined high liquid level and a predetermined low liquid level, passing a portion of said liquid from said cavern to a second underground surge cavern when the liquid level in said surface surge zone reaches said predetermined high liquid level, said second cavern having a pool of liquid displacing medium normally occupying the lower portion thereof and heavier than and immiscible with said liquid, said liquid introduced into said second cavern displacing said displacing medium therefrom, discontinuing the passing of said liquid to said second cavern when the liquid level in said surface surge zone falls to a point intermediate said predetermined liquid levels, passing said liquid from said second cavern to said surface surge zone when the liquid level therein falls to said predetermined low liquid level, said displacing medium being introduced into said second cavern to thus displace said liquid therefrom, and discontinuing the withdrawal of said liquid from said second cavern when the liquid level in said surface surge zone reaches said point intermediate said predetermined liquid levels.

7. A surge system comprising, in combination, a surface surge tank, a feed supply line and a feed withdrawal line connected to said tank, flow rate control means connected to said feed withdrawal line to maintain the flow therethrough at a constant rate, liquid level control means adapted to continuously monitor the liquid level in said tank, said liquid level normally varying between a predetermined high liquid level and a predetermined low liquid level, an underground surge cavern, the latter comprising a cavity formed within an underground impermeable formation and having an access bore communicating with ground surface, a pool of liquid displacing medium normally occupying the lower portion of said cavity, a first line connected to said feed supply line and said access bore, first pump means in said first line, a second line connected to said access bore and said tank, first flow control means in said second line, a source of said displacing medium, a third line connected between said source and said pool of liquid displacing medium, second flow control means in said third line, a fourth line connected between said source and said pool of liquid displacing medium, and second pump means in said fourth line, said pump means and flow control means operatively connected to said liquid level control means, said first pump means being operated and said first flow control means being closed and said second flow control means being opened when said liquid level reaches said predetermined high liquid level, said second pump means being operated and said first flow control means being opened and said second flow control means being closed when said liquid level falls to said predetermined low liquid level.

8. A surge system comprising, in combination, a first undergound surge cavern, a feed supply line connected to said cavern, a surface surge tank, a first line connected between said cavern and said tank, a feed withdrawal line connected to said tank, flow rate control means connected to said feed withdrawal line to maintain the flow therethrough at a constant rate, liquid level control means adapted to continuously monitor the liquid level in said tank, said liquid level normally varying between a predetermined high liquid level and a predetermined low liquid level, a second undergound surge cavern, a second line connected between said first and second caverns, pump means in said second line, a third line connected between said second cavern and said tank, and flow control means in said third line, a source of liquid displacing medium, a fourth line connected between said source and a pool of liquid displacing medium normally occupying the lower portion of said second cavern, said pump means and flow control means being operatively connected to said liquid level control means, said pump means adapted to operate and said flow control means adapted to close when said liquid level reaches said predetermined high liquid level, said flow control means adapted to open when said liquid level falls to said predetermined low liquid level and permit gravity flow of said liquid displacing medium from said source to said pool to displace said liquid from said second cavern through said second and third lines to said surface surge tank.

9. The surge system according to claim 7 wherein said liquid displacing medium is heavier than and immiscible with said liquid.

References Cited in the file of this patent
UNITED STATES PATENTS
2,085,526  Diescher _____ June 29, 1937